(12) United States Patent
O'Donnell et al.

(10) Patent No.: US 10,430,037 B2
(45) Date of Patent: Oct. 1, 2019

(54) CONTROLLING WEB PAGE BEHAVIOUR

(75) Inventors: Dara James Edward O'Donnell, Newbury (GB); Lincoln Mark Vaughan Goldspink, Newbury (GB)

(73) Assignee: D4T4 SOLUTIONS PLC, Sunbury-on-Thames, Middlesex (GB)

( * ) Notice: Subject to any disclaimer, the term of this patent is extended or adjusted under 35 U.S.C. 154(b) by 605 days.

(21) Appl. No.: 14/003,047

(22) PCT Filed: Mar. 6, 2012

(86) PCT No.: PCT/GB2012/000221
§ 371 (c)(1),
(2), (4) Date: Sep. 27, 2013

(87) PCT Pub. No.: WO2012/120257
PCT Pub. Date: Sep. 13, 2012

(65) Prior Publication Data
US 2014/0026081 A1  Jan. 23, 2014

Related U.S. Application Data

(60) Provisional application No. 61/457,414, filed on Mar. 22, 2011.

(30) Foreign Application Priority Data

Mar. 7, 2011 (GB) .................................. 1103862.7

(51) Int. Cl.
*G06F 3/048* (2013.01)
*G06F 3/0484* (2013.01)
(Continued)

(52) U.S. Cl.
CPC ............ *G06F 3/0484* (2013.01); *G06F 11/34* (2013.01); *G06F 11/3438* (2013.01);
(Continued)

(58) Field of Classification Search
CPC ................................ G06F 3/0484; G06F 3/048
See application file for complete search history.

(56) References Cited

U.S. PATENT DOCUMENTS 6,351,745 B1 * 2/2002 Itakura .................. G06F 3/1423
6,393,407 B1   5/2002 Middleton, III et al.
(Continued)

FOREIGN PATENT DOCUMENTS

EP        1 045 547       10/2000
EP        1045547 A2 *    10/2000   ............. G06Q 30/02
(Continued)

OTHER PUBLICATIONS

RaYell, "event.preventDefault() vs. return false" in www.stackoverflow.com [online] posted Aug. 31, 2009 at 11:58 [retrieved Sep. 25, 2017]. Retrieved from the Internet: <https://stackoverflow.com/questions/1357118/event-preventdefault-vs-return-false>.*
(Continued)

*Primary Examiner* — Pei Yong Weng
(74) *Attorney, Agent, or Firm* — Nixon & Vanderhye P.C.

(57) ABSTRACT

A method of controlling webpage behaviour on a web enabled device 3 in order to assist in, for example, collection of monitoring information, preserving session context, and improving security. The method includes monitoring a user interaction with a webpage (step 203), using a client side module 31 at the web enabled device 3, and determining whether predetermined conditions are satisfied (step 204). Where the predetermined conditions are satisfied the further steps below are carried out: capturing details concerning an intended result of said user interaction (step 205), using the client side module; at least temporarily preventing occurrence of the intended result of said user interaction using the client side module (step 206); carrying out additional processing (step 207) using the client side module; determining a controlled result (step 208), using the client side module,
(Continued)

in dependence on said intended result and the additional processing; and causing the controlled result to occur (step 209). The additional processing might, for example, include collecting monitoring information, dynamically re-writing the URL to allow preservation of session context, or performing in checks or modifications to improve security.

23 Claims, 5 Drawing Sheets (51) Int. Cl.
*G06F 11/34* (2006.01)
*H04L 29/08* (2006.01)
*G06Q 30/02* (2012.01)
*G06F 16/335* (2019.01)
*G06F 16/9535* (2019.01)

(52) U.S. Cl.
CPC ...... *G06F 11/3476* (2013.01); *G06F 11/3495* (2013.01); *G06F 16/335* (2019.01); *G06F 16/9535* (2019.01); *G06Q 30/02* (2013.01); *H04L 67/02* (2013.01); *H04L 67/025* (2013.01); *H04L 67/22* (2013.01); *G06F 2201/875* (2013.01); *Y02D 10/34* (2018.01)

(56) References Cited

U.S. PATENT DOCUMENTS

| | | | |
|---|---|---|---|
| 8,239,445 B1* | 8/2012 | Gage | H04L 29/06 709/203 |
| 2002/0111865 A1 | 8/2002 | Middleton, III et al. | |
| 2002/0196275 A1* | 12/2002 | Willner | G06Q 30/02 715/744 |
| 2003/0187976 A1 | 10/2003 | Decime | |
| 2006/0031404 A1* | 2/2006 | Kassab | G06F 17/30893 709/218 |
| 2006/0212514 A1 | 9/2006 | Saillet | |
| 2008/0071881 A1 | 3/2008 | Kronlund | |
| 2008/0270412 A1 | 10/2008 | Udayasankar et al. | |
| 2009/0024737 A1 | 1/2009 | Goldspink | |
| 2009/0024748 A1 | 1/2009 | Goldspink | |
| 2009/0119675 A1 | 5/2009 | Higgins | |
| 2009/0119769 A1* | 5/2009 | Ross | G06F 21/55 726/13 |
| 2009/0193497 A1* | 7/2009 | Kikuchi | G06F 21/54 726/1 |
| 2010/0088358 A1 | 4/2010 | Schunemann | |
| 2012/0030338 A1* | 2/2012 | Zhang | G06F 11/3419 709/223 |
| 2012/0030559 A1* | 2/2012 | Manion | G06F 8/61 715/234 |

FOREIGN PATENT DOCUMENTS

| | | | | |
|---|---|---|---|---|
| EP | 1179939 A2 * | 2/2002 | ....... | G06F 17/30899 |
| EP | 2 037 384 A1 | 3/2009 | | |
| PE | 1 045 547 A2 | 10/2000 | | |
| WO | 99/13423 A1 | 3/1999 | | |
| WO | WO 99/13423 | 3/1999 | | |

OTHER PUBLICATIONS

BeLienig, "How to rename a field using JavaScript?" in www.pentaho.com [online] posted Sep. 13, 2007 at 12:00 pm [retrieved Sep. 25, 2017]. Retrieved from the Internet: <http://forums.pentaho.com/showthread.php?56616-How-to-rename-a-field-using-javascript>.*

Lloyd, Kevin, "The Secret of Cancelling and Stopping Events using JavaScript" in www.webdevelopment2.com [online] posted Dec. 19, 2006 [retrieved Sep. 25, 2017]. Retrieved from the Internet: <https://webdevelopment2.com/the-secret-of-cancelling-and-stopping-events-using-javascript/ >.*

International Search Report for PCT/GB2012/000221 dated Mar. 5, 2013.

Written Opinion of the International Searching Authority dated Mar. 5, 2013.

How to modularize and package a client-side Javascript library today? Jun. 24, 2016, pp. 1-2 http://programmers.stackexchange.com/questions/198404/how-to-modularize-and-package-a-client-side-javascript-library-today.

What are the best client-side JavaScript module loaders? Jun. 22, 2016, pp. 1-6 http://www.slant.co/topics/1089/~client-side-javascript-module-loaders.

HTTP specification RFC 2616, Jul. 11, 2016, pp. 1-39 http://www.w3.org/Protocols/rfc2616/rfc2616-sec14.html.

GB Search Report re GB 1 103 862.7 dated Jul. 7, 2011.

* cited by examiner

CONTROLLING WEB PAGE BEHAVIOUR

This application is the U.S. national phase of International Application No. PCT/GB2012/000221filed 6 Mar. 2012 which designated the U.S. and claims priority to GB 1103862.7 filed 7 Mar. 2011, and U.S. Provisional Application No. 61/457,414 filed 22 Mar. 2011, the entire contents of each of which are hereby incorporated by reference.

There are various web enabled devices currently in use such as general purpose computers loaded with appropriate browsers and provided with a connection to the internet, mobile devices such as mobile telephones or smart phones, game consoles and so on. Further, of course, web content is made available to each of these types of device by an enormous number of entities via websites. There has been an increasing desire to monitor behaviour of websites as perceived by the user and to monitor user behaviour whilst browsing web pages and websites so that, for example, an improved experience can be provided to the user and web pages may, for example, be tailored to a user. At the same time, security and/or privacy issues are often of concern as web enabled devices are used.

This application is directed to allowing control of web page behaviour with an eye on the above issues.

At least some of the techniques described in the present application are particularly relevant where client side page tagging monitoring techniques are used. Such monitoring techniques are currently used in systems and services provided by the applicant and described for example in the applicant's previous patent applications such as WO 01/69412, WO 01/69386 and WO 2007/088334. As those skilled in the art understand from such prior art teachings, a client-side page tagging technique uses a tag in the webpage to cause calling of a portion of script, typically JavaScript, to run within the webpage as a client side JavaScript module on the web enabled device.

In using such techniques, it is beneficial for entities if it is possible to maintain session context with regards to the monitoring information as users navigate from page to page, and also possibly from domain to domain, where an entity has one or more websites in different domains. In practice this is quite common as an entity will often have a ".com" site as well as a ".co.uk" site and/or a ".eu" site and so on. In general terms cookies can be used to maintain session context in such techniques. However, due to security settings on browsers, as recognised in the applicant's existing technology and as explained in the patent applications above, the use of third party cookies is not practical. Using first party cookies is more practical but comes with difficulties when one is trying to maintain session context across domains. The client's existing technology, as explained in the above applications, provides one technique for dealing with this issue. At least some aspects of the present invention are aimed at providing alternative solutions to allow session context to be maintained between pages and even across domains.

A further issue in the realm of client side page tagging monitoring techniques is that there is a risk that monitoring data will be lost as a page transition is experienced at the web enabled device. Again at least some aspects of the present invention are aimed at alleviating this problem.

However, the usefulness of the present techniques is not limited to the area of client side page tagging monitoring techniques.

According to a first aspect of the present invention there is provided a method of controlling webpage behaviour on a web enabled device comprising the steps of:

monitoring a user interaction with a webpage, using a client side module at the web enabled device;

determining whether predetermined conditions are satisfied, and where the predetermined conditions are satisfied, carrying out the further steps of:

capturing details concerning an intended result of said user interaction, using the client side module;

at least temporarily preventing occurrence of the intended result of said user interaction using the client side module;

carrying out additional processing using the client side module;

determining a controlled result, using the client side module, in dependence on said intended result and the additional processing; and causing the controlled result to occur.

Here the expression intended result is used to refer to a result which the webpage as delivered to the web enabled device is designed to produce in response to the respective user interaction in the absence of the client side module.

The controlled result may be the same as the intended result. The controlled result may be no action—that is cancelling of the intended result. The controlled result may be a modified result.

The method may comprise the further steps, before the above mentioned steps, of receiving a webpage at a web enabled device, and calling the client side module.

The user interaction may be one having an intended result of sending of a data message from the web enabled device. The data message may include a request for a new webpage. The data message may comprise a URL query string.

The user interaction may be one having an intended result of causing a page transition at the web enabled device.

The user interaction may comprise activating, for example clicking on, a link. The user interaction may comprise a form post.

The step of carrying out additional processing may comprise introducing a delay between said user interaction and the step of causing the controlled result to occur.

The delay can provide time for other actions to be completed. This can be particularly useful if the intended result of the user interaction comprises a page transition. Other actions may be completed before the page transition is allowed to occur. This can include processing and exporting monitoring data collected in relation to the current webpage.

The step of carrying out additional processing may comprise carrying out further processing steps during said delay.

The step of carrying out additional processing may comprise using a timer to control said delay. The timer may be used to introduce and/or limit the delay. In some cases the further processing may introduce the delay by the fact of the further processing being arranged to be executed before the controlled result. In such a case the timer may be used to limit the delay.

The further processing steps may be carried out asynchronously (in the sense of independently) to the timer operation.

The additional processing, and where appropriate the further processing steps, may, for example, comprise any one of or any combination of:

dynamic URL re-writing of a URL for a target page identified in the captured details concerning the intended result of said user interaction to append selected parameters;

processing and exporting monitoring data collected during interaction with the webpage;

verifying whether a target page specified in a page transition identified in the captured details concerning the intended result of said user interaction belongs to a predetermined set of valid pages;

determining whether referrer information held at the web enabled device should be deleted to prevent onward transmission to a subsequent page.

The selected parameters appended to the URL in the URL re-writing may be session context parameters for the client side module. These will then be visible to the web enabled device when the target page is visited. If the client side module is called whilst the target page is active, the client side module will be able to pick-up the session context parameters and maintain session context.

The step of determining whether predetermined conditions are satisfied may comprise determining whether the web enabled device supports fail-safe interaction cancelling. Said predetermined conditions may comprise support of fail-safe interaction cancelling by the web enabled device.

The step of determining whether predetermined conditions are satisfied may comprise the steps of the client side module applying a filter to the user interaction with the webpage and determining whether said user interaction passes said filtering.

The filter may specify at least one type of interaction which passes the filter. The filter may specify at least one characteristic of an interaction which is necessary and/or sufficient for the respective interaction to pass the filter. The characteristic of an interaction may comprise a characteristic of an intended result of the interaction.

In one set of embodiments the predetermined conditions may comprise the user interaction being one having an intended result of causing a page transition at the web enabled device. The predetermined conditions may comprise the user interaction being one having an intended result of causing a page transition to a page in a different domain than the current page. The predetermined conditions may comprise the user interaction being one having an intended result of causing a page transition to a page in one domain from a predetermined set of domains.

The set of domains may be a set of domains controlled by one entity.

The method may comprise the further step of causing the intended result to occur as the controlled result if at least one of:

the additional processing fails;

the additional processing fails to complete before the end of a delay allowed by a timer as part of the additional processing;

fail-safe interaction cancelling of the web enabled device is invoked.

Where the user interaction is the activation of a link, the link activation event's prevent default method may be invoked to at least temporarily prevent occurrence of the intended result.

Where the user interaction is activation of a submit on a form, the step of at least temporarily preventing occurrence of the intended result, may comprise wrapping the form in another object. Alternatively the step may comprise making use of the fact that the form is wrapped in another object. In such a case the method may comprise the step of wrapping any form in the webpage in a respective other object before the step of determining whether predetermined conditions are satisfied. Here wrapping the form in another object comprises renaming an original submit function of the form from an old name to a new name and renaming said other object with the old name of the original submit function. The additional processing may be defined within or called from within said other object. The original submit function may be called as part of the additional processing using the new name applied in the renaming.

Typically the webpage received will include code which causes calling of the client side module. Typically the client side module may then be downloaded onto the web enabled device. In alternatives the client side module may be resident on the web enabled device. Further in alternatives, calling of the client side module may be initiated by the web enabled device without the presence of code in the webpage which causes calling of the client side module.

According to a second aspect of the present invention there is provided a web enabled device arranged for controlling webpage behaviour on the web enabled device, the web enabled device being arranged under the control of software to:

monitor a user interaction with a webpage, using a client side module at the web enabled device;

determine whether predetermined conditions are satisfied, and being arranged, where the predetermined conditions are satisfied, to:

capture details concerning an intended result of said user interaction, using the client side module;

at least temporarily prevent occurrence of the intended result of said user interaction using the client side module;

carry out additional processing using the client side module;

determine a controlled result, using the client side module, in dependence on said intended result and the additional processing; and cause the controlled result to occur.

According to a third aspect of the present invention there is provided a method of collecting client side webpage monitoring information at a web enabled device comprising the steps of:

monitoring user interactions with a webpage and collecting monitoring information, using a client side module at the web enabled device;

sending data representative of said monitoring information from the web enabled device to a server;

determining whether an intended result of a monitored user interaction comprises a page transition, and where the intended result of the monitored user interaction comprises a page transition, carrying out the further steps of:

capturing details concerning the intended result of said monitored user interaction, using the client side module;

at least temporarily preventing occurrence of the intended result of said monitored user interaction using the client side module;

carrying out additional processing using the client side module;

determining a controlled result, using the client side module, in dependence on said intended result and the additional processing; and causing the controlled result to occur, wherein said additional processing comprises using a timer to introduce a delay between said user interaction and the step of causing the controlled result to occur.

Depending on the implementation the timer may introduce and/or limit the delay. This can allow time (where necessary) for processing of and/or export from the web enabled device of the data representative of said monitoring information before the page transition occurs, and/or prevent too large a delay being incurred.

According to a fourth aspect of the present invention there is provided a web enabled device arranged for collecting client side webpage monitoring information, the web enabled device being arranged under the control of software to:

monitor user interactions with a webpage and collect monitoring information, using a client side module at the web enabled device;

send data representative of said monitoring information from the web enabled device to a server;

determine whether an intended result of a monitored user interaction comprises a page transition, and being arranged, where the intended result of the monitored user interaction comprises a page transition, to:

capture details concerning the intended result of said monitored user interaction, using the client side module;

at least temporarily prevent occurrence of the intended result of said monitored user interaction using the client side module;

carry out additional processing using the client side module;

determine a controlled result, using the client side module, in dependence on said intended result and the additional processing; and cause the controlled result to occur, wherein said additional processing comprises using a timer to control a delay between said user interaction and the controlled result being caused to occur.

According to a fifth aspect of the present invention there is provided a method of collecting client side webpage monitoring information at a web enabled device comprising the steps of:

monitoring user interactions with a webpage and collecting monitoring information, using a client side module at the web enabled device;

sending data representative of said monitoring information from the web enabled device to a server;

determining whether predetermined conditions are satisfied in respect of a monitored user interaction, and where the predetermined conditions are satisfied, carrying out the further steps of:

capturing details concerning an intended result of said monitored user interaction, using the client side module;

at least temporarily preventing occurrence of the intended result of said monitored user interaction using the client side module;

carrying out additional processing using the client side module;

determining a controlled result, using the client side module, in dependence on said intended result and the additional processing; and causing the controlled result to occur.

According to a sixth aspect of the present invention there is provided a method of maintaining session context on a web enabled device comprising the steps of:

monitoring a user interaction with a webpage, using the client side module on the web enabled device;

determining whether an intended result of the monitored user interaction comprises a page transition to a target page, and where the intended result of the monitored user interaction comprises a page transition, carrying out the further steps of:

capturing details concerning the intended result of said user interaction including a URL for the target page, using the client side module;

at least temporarily preventing occurrence of the intended result of said user interaction using the client side module;

carrying out additional processing using the client side module;

determining a controlled result, using the client side module, in dependence on said intended result and the additional processing; and causing the controlled result to occur, wherein the additional processing comprises dynamic URL rewriting of the URL for the target page identified in the captured details concerning the intended result of said user interaction to provide a re-written URL including appended session context parameters; and said controlled result comprises requesting the target page using the re-written URL.

The session context parameters can then be seen by the web enabled device when the target page is active in the device, which means that session context may be maintained.

According to a seventh aspect of the present invention there is provided a web enabled device arranged for maintaining session context, the web enabled device being arranged under the control of software to:

monitor a user interaction with a webpage, using a client side module at the web enabled device;

determine whether an intended result of the monitored user interaction comprises a page transition to a target page, and being arranged, where the intended result of the monitored user interaction comprises a page transition, to:

capture details concerning the intended result of said user interaction including a URL for the target page, using the client side module;

at least temporarily prevent occurrence of the intended result of said user interaction using the client side module;

carry out additional processing using the client side module;

determine a controlled result, using the client side module, in dependence on said intended result and the additional processing; and cause the controlled result to occur, wherein the additional processing comprises dynamic URL rewriting of the URL for the target page identified in the captured details concerning the intended result of said user interaction to provide a re-written URL including appended session context parameters; and said controlled result comprises requesting the target page using the re-written URL.

According to an eighth aspect of the present invention there is provided a method of maintaining session context on a web enabled device comprising the steps of:

monitoring a user interaction with a webpage, using a client side module at the web enabled device;

determining whether predetermined conditions are satisfied, and where the predetermined conditions are satisfied, carrying out the further steps of:

capturing details concerning an intended result of said user interaction, using the client side module;

at least temporarily preventing occurrence of the intended result of said user interaction using the client side module;

carrying out additional processing using the client side module;

determining a controlled result, using the client side module, in dependence on said intended result and the additional processing; and causing the controlled result to occur, wherein the predetermined conditions comprise the user interaction being one having an intended result of causing a page transition to a target page at the web enabled device;

the additional processing comprises dynamic URL rewriting of a URL for the target page to provide a re-written URL including append session context parameters; and said controlled result comprises requesting the target page using the re-written URL.

According to a ninth aspect of the present invention there is provided a security method for a web enabled device comprising the steps of:

monitoring a user interaction with a webpage, using a client side module at the web enabled device;

determining whether an intended result of the monitored user interaction comprises a page transition to a target page, and where the intended result of the monitored user interaction comprises a page transition, carrying out the further steps of:

capturing details concerning the intended result of said user interaction, using the client side module;

at least temporarily preventing occurrence of the intended result of said user interaction using the client side module;

carrying out additional processing using the client side module;

determining a controlled result, using the client side module, in dependence on said intended result and the additional processing; and causing the controlled result to occur, wherein the controlled result comprises one of:

requesting the target page whilst suppressing referrer information; and cancelling the page request.

According to a tenth aspect of the present invention there is provided a web enabled device arranged for providing security, the web enabled device being arranged under the control of software to:

monitor a user interaction with a webpage, using a client side module at the web enabled device;

determine whether an intended result of the monitored user interaction comprises a page transition to a target page, and being arranged, where the intended result of the monitored user interaction comprises a page transition, to:

capture details concerning the intended result of said user interaction, using the client side module;

at least temporarily prevent occurrence of the intended result of said user interaction using the client side module;

carry out additional processing using the client side module;

determine a controlled result, using the client side module, in dependence on said intended result and the additional processing; and cause the controlled result to occur, wherein the controlled result comprises one of:

requesting the target page whilst suppressing referrer information; and cancelling the page request.

According to another aspect of the present invention there is provided a computer program comprising code portions which when loaded and run on a web enabled device cause the web enabled device to execute any one of the methods defined above and/or cause the web enabled device to constitute any one of the web enabled devices defined above.

According to a further aspect of the present invention there is provided a machine readable medium carrying a computer program comprising code portions which when loaded and run on a web enabled device cause the web enabled device to execute any one of the methods defined above and/or cause the web enabled device to constitute any one of the web enabled devices defined above.

According to another aspect of the present invention there is provided a method of controlling webpage behaviour on a web enabled device comprising the steps of:

monitoring a user interaction with a webpage, using a client side module running on the web enabled device;

determining whether predetermined conditions are satisfied, and where the predetermined conditions are satisfied, carrying out the further steps of:

capturing details concerning an intended result of said user interaction, using the client side module, the intended result being an intended resulting operation of the web enabled device;

cancelling occurrence of the intended result of said user interaction using the client side module;

carrying out additional processing using the client side module;

determining a controlled result, using the client side module, in dependence on said intended result and the additional processing; and causing the controlled result to occur, wherein, the predetermined conditions comprise the user interaction being one having an intended result of causing a page transition at the web enabled device, and the controlled result is a controlled resulting operation of the web enabled device and comprises one of:

i) no action in response to the user interaction;

ii) a regeneration of the intended result; and iii) a modified result which is a modified resulting operation of the web enabled device.

According to another aspect of the present invention there is provided a web enabled device arranged for controlling webpage behaviour on the web enabled device, the web enabled device being arranged under the control of software to:

monitor a user interaction with a webpage, using a client side module running on the web enabled device;

determine whether predetermined conditions are satisfied, and being arranged, where the predetermined conditions are satisfied, to:

capture details concerning an intended result of said user interaction, using the client side module, the intended result being an intended resulting operation of the web enabled device;

cancel occurrence of the intended result of said user interaction using the client side module;

carry out additional processing using the client side module;

determine a controlled result, using the client side module, in dependence on said intended result and the additional processing; and cause the controlled result to occur, wherein, the predetermined conditions comprise the user interaction being one having an intended result of causing a page transition at the web enabled device, and the controlled result is a controlled resulting operation of the web enabled device and comprises one of:

i) no action in response to the user interaction;

ii) a regeneration of the intended result; and iii) a modified result which is a modified resulting operation of the web enabled device.

This provides an opportunity for desired operations to be carried out before a page transition occurs in a controlled way that does not rely merely on undesirably spinning the browser/CPU for a period to buy some time. This can help ensure that performance of the device and/or power consumption are not adversely affected.

Note that, in general terms and with the necessary modifications in wording, all of the further features defined above following the first aspect of the invention are applicable as further features of all of the other aspects of the invention defined above. These further features are not restated after each aspect of the invention merely for the sake of brevity.

Embodiments of the present invention will now be described, by way of example only, with reference to the accompanying drawings in which.

Figure 1:
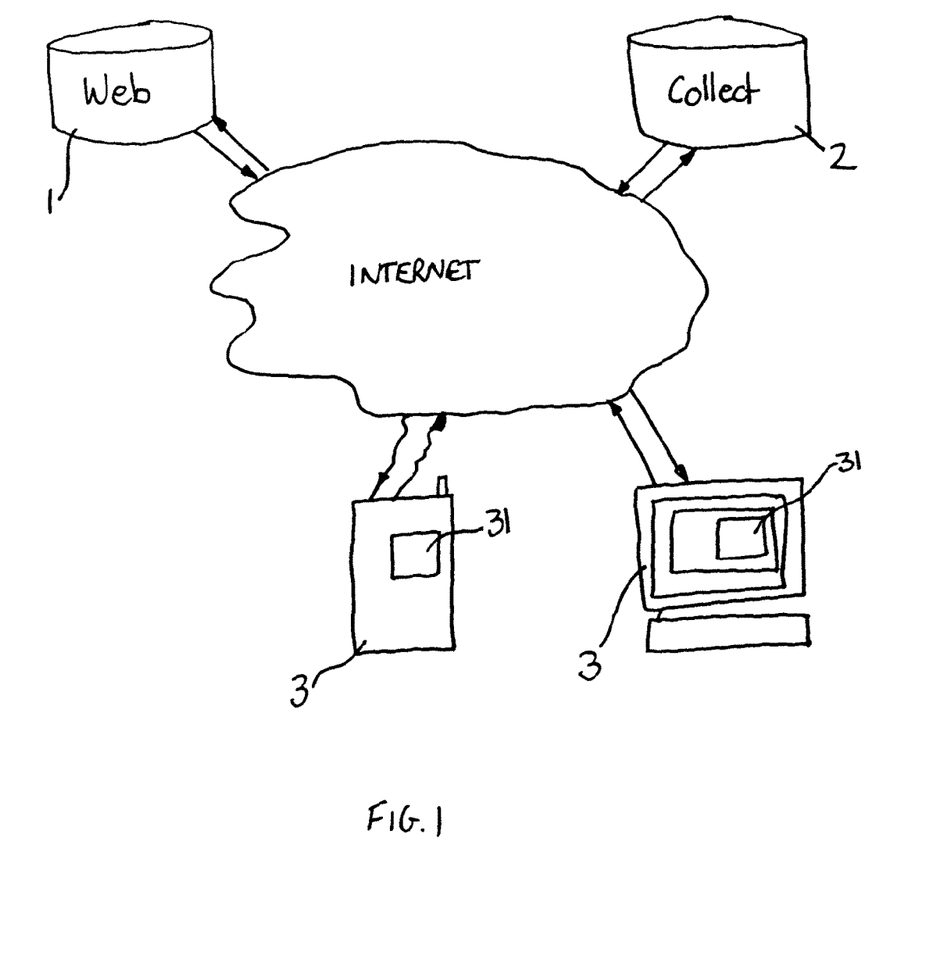
FIG. 1 schematically shows the architecture of a website monitoring system for monitoring the behaviour of web pages on one or more web enabled device.

FIG. 1 schematically shows the basic general architecture used in a client side page tagging webpage monitoring system. The system comprises one or more web server 1, one or more collection server 2 for collecting the monitoring information, and any number of web enabled devices 3 all of which may communicate with one another via the Internet. In FIG. 1 two example web enabled devices 3 are shown. First there is a mobile device such as a mobile phone which is web enabled, for example, by including an embedded browser or "app" or similar. Second there is a general purpose computer 3 which is web enabled by virtue of having loaded onto it a web browser and appropriate software for connecting to the Internet.

In client side page tagging monitoring techniques, where an entity with a website wishes their webpages/website to be monitored they include an appropriate tag on each webpage to be monitored. When such a webpage is delivered to a web enabled device 3 the tag in the page causes a monitoring application, or client side module 31, to be called by the webpage. This client side module 31 may then perform the necessary steps to monitor the behaviour of the webpage as perceived by the user and user interactions and collect monitoring information. Furthermore the client side module 31 may be arranged to send the monitoring information back to the collection server 2.

The client side module 31 may be delivered from the collection server 2 (or web server 1) to the web enabled device 3 when it is called by the page or alternatively the client side module 31 might be resident on the web enabled device.

Further note that whilst the web server 1 and collection server 2 are shown separately in FIG. 1 this is not essential. That is to say the web server 1 and the collection server 2 can be the same machine and/or controlled by the same entity although this is not the normal architecture used.

The architecture and techniques described above in relation to FIG. 1 are already known and used by the applicant amongst others and the applicant's version of these techniques are described in more detail in the applicant's earlier patent applications such as WO 01/69412, WO 01/69386 and WO 2007/088334.

In the embodiments of the present invention described below the above described architecture is used, as is the basic technique of providing client side tagged web pages. However in the present embodiments further functionality is provided by the client side module 31 and this is of particular interest and described in more detail below.

Figure 2:
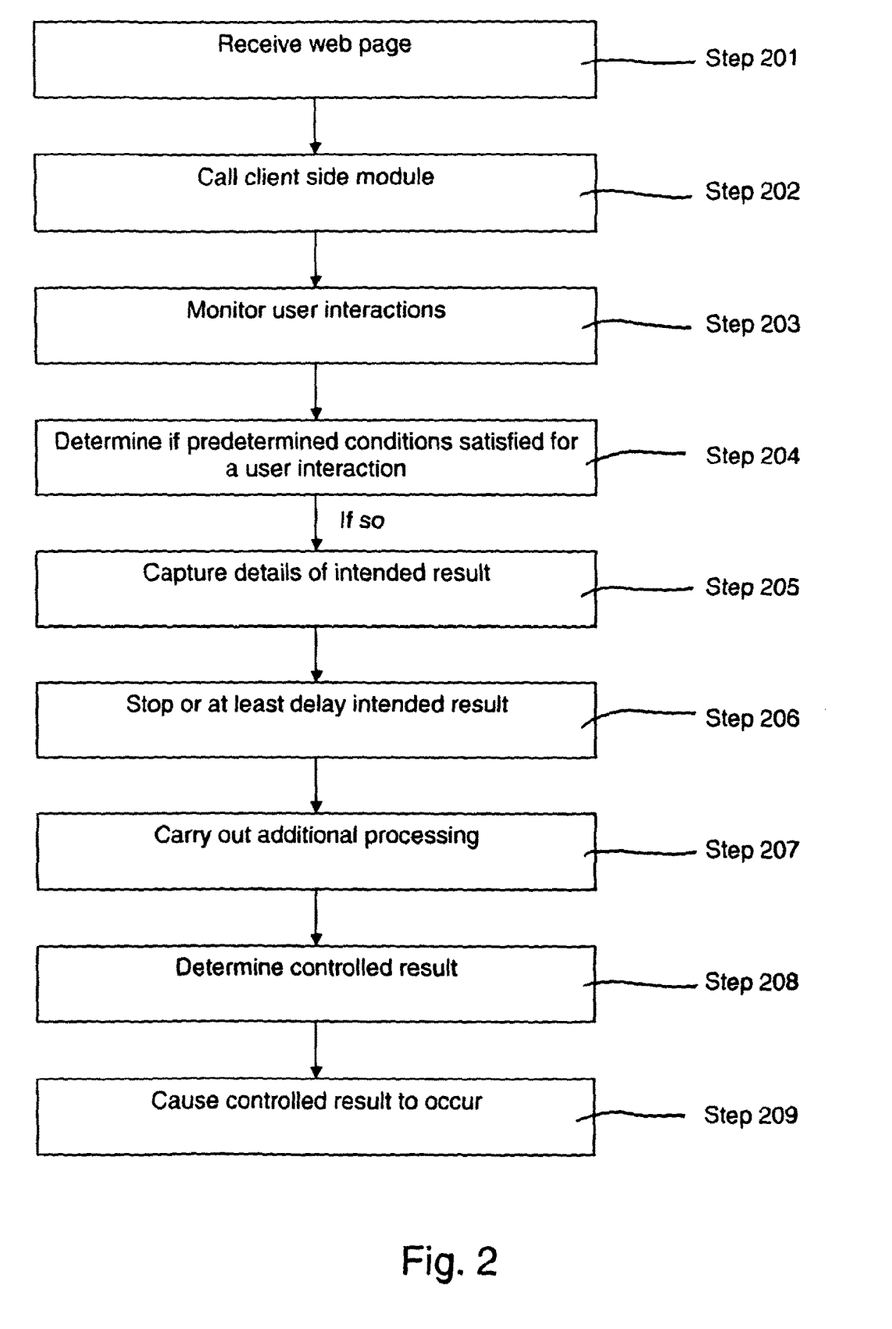
FIG. 2 shows a flow chart showing a method of controlling webpage behaviour on a web enabled device.

FIG. 2 schematically shows a method for controlling webpage behaviour on a web enabled device 3.

In step 201 a webpage is received at the web enabled device 3. In the present embodiment, for the methods to function the webpage must include a tag to call the client side module 31. If not the current method will stop. Assuming that there is such a tag, then the following steps of the method can be carried out.

In step 202 the client side module 31 is called by the web page. Then in step 203 the client side module 31, running within the web page, is used to monitor user interactions with the webpage. In the present embodiment then, whilst this is not essential, the client side module 31 will also carry out the basic function of collecting monitoring information based on user interactions and submitting this back to the collection server 2.

In step 204 it is determined whether predetermined conditions are satisfied at the time when a particular user interaction with the web page is monitored. If the predetermined conditions are satisfied at that stage, the further steps of the method of the present embodiment may be carried out.

Thus if the predetermined conditions are satisfied in respect of a monitored user interaction, then in step 205 details of an intended result of that user interaction are captured.

Then in step 206 the intended result of that user interaction is stopped or at least delayed.

Following this, in step 207, the client side module 31 carries out additional processing.

Then in step 208 a controlled result is determined in dependence on the additional processing and the original intended result as captured in step 205.

After this, in step 209, the controlled result is caused to occur by the client side module 31.

Note that in the present embodiment all of steps 203 to 209 are carried out by the client side module 31. On the other hand, the initial steps 201 and 202 are carried out by other software provided on the web enabled device 3 such as browser software or similar. Further whilst the client side module is arranged to cause the controlled result to occur, in step 209, then actual execution of the controlled result will again most likely be carried out by other software provided at the web enabled device 3 such as, for example, browser software.

The predetermined conditions tested against in step 204 may take various different forms. As an example one of the predetermined conditions may be that the web enabled device 3 supports fail-safe interaction cancelling. As another example, then most likely, the user interactions will be filtered such that steps 205 to 209 are only executed when the user interaction has one or more particular characteristics.

Most typically, and in the case of the present embodiment, a predetermined condition in step 204 is that the user interaction is one which has an intended result of causing a page transition (i.e. will cause the web enabled device to navigate to a new page). That is to say steps 205-209 will only be executed if the user interaction being considered at that time is one which will cause a page transition.

Furthermore in such a situation then step 205 includes capturing a URL (uniform resource locator) of a target page of the page transition. In such a case the intended result comprises navigation to a target page having that URL. However by virtue of the client side module 31 executing steps 205-209 a different controlled result may be achieved.

For example the controlled result might be navigation to the original target page but after some delay introduced by the additional processing in step 207, or might be navigation to a different page or cancellation of the navigation, or navigation to the target page but with referrer information deleted, or navigation to the target page but with a modified URL query string.

Which of these results occurs is determined by the additional processing carried out in step 207.

As is well understood, in this context, "referrer information" is information available within the web enabled device visible to code executing in the web enabled device, typically the web browser.

Thus in general terms, the result of use of the method described above in relation to FIG. 2 (or a device controlled by software to execute the method) may be one or more of: improved security, improved collection of monitoring data, the ability to maintain session context and so on.

Different techniques may be used to stop or at least delay the intended result in step 206 depending on the user interaction being considered at that time and also the underlying technology of the web enabled device and its browser or similar software.

In some instances, for example, in the case of Internet Explorer® browsers, if the monitored event is link activation (for example a click on a link) then the event's prevent default method may be invoked.

In other instances where the monitored user interaction, which has triggered the performance of steps 205 to 209, is the activation of a submit function on a form then a form wrapping technique may be used. This may rely on the form wrapping technique having been carried out by the client side module 31 for all forms in the webpage before step 204 or may take place in respect of the particular form after step 204.

In a form wrapping technique, the submit function of the form is wrapped in another object. This is achieved by renaming an original submit function of the form from an old name to a new name and renaming said other object with the old name of the original submit function. Then the additional processing in step 207 may be defined within or called from within said other object. Furthermore, the original submit function may be called as part of the additional processing using the new name applied in the renaming.

It will be appreciated that in the case of other monitored user interactions which trigger the execution of steps 205-209 and/or in web enabled devices 3 using different underlying technology, other techniques may be available for stopping or at least delaying the intended result of the user interaction in step 206.

At the present time three different particular implementations of the method described above in relation to FIG. 2/a web enabled device 3 arranged under the control of software for carrying out the method described above in FIG. 2 are considered of particular interest:

1) Enhancing the collection of monitoring information by introducing a delay before a page transition during which delay, monitoring data may be processed and exported to the collection server 2.

2) Preserving session context as a web enabled device 3 navigates from one page to another page (and possibly to another domain) using URL re-writing to generate a URL query string which includes session context parameters.

3) Providing security functions by controlling to which pages a user may navigate from a current page and/or controlling the onward transmission of referrer information at a page transition.

Each of these different techniques is most relevant when a page transition occurs and each may be implemented in respect of monitored interactions which are link activations or form submit actions amongst other things.

These particular implementations are described in more detail below.

Figure 3:
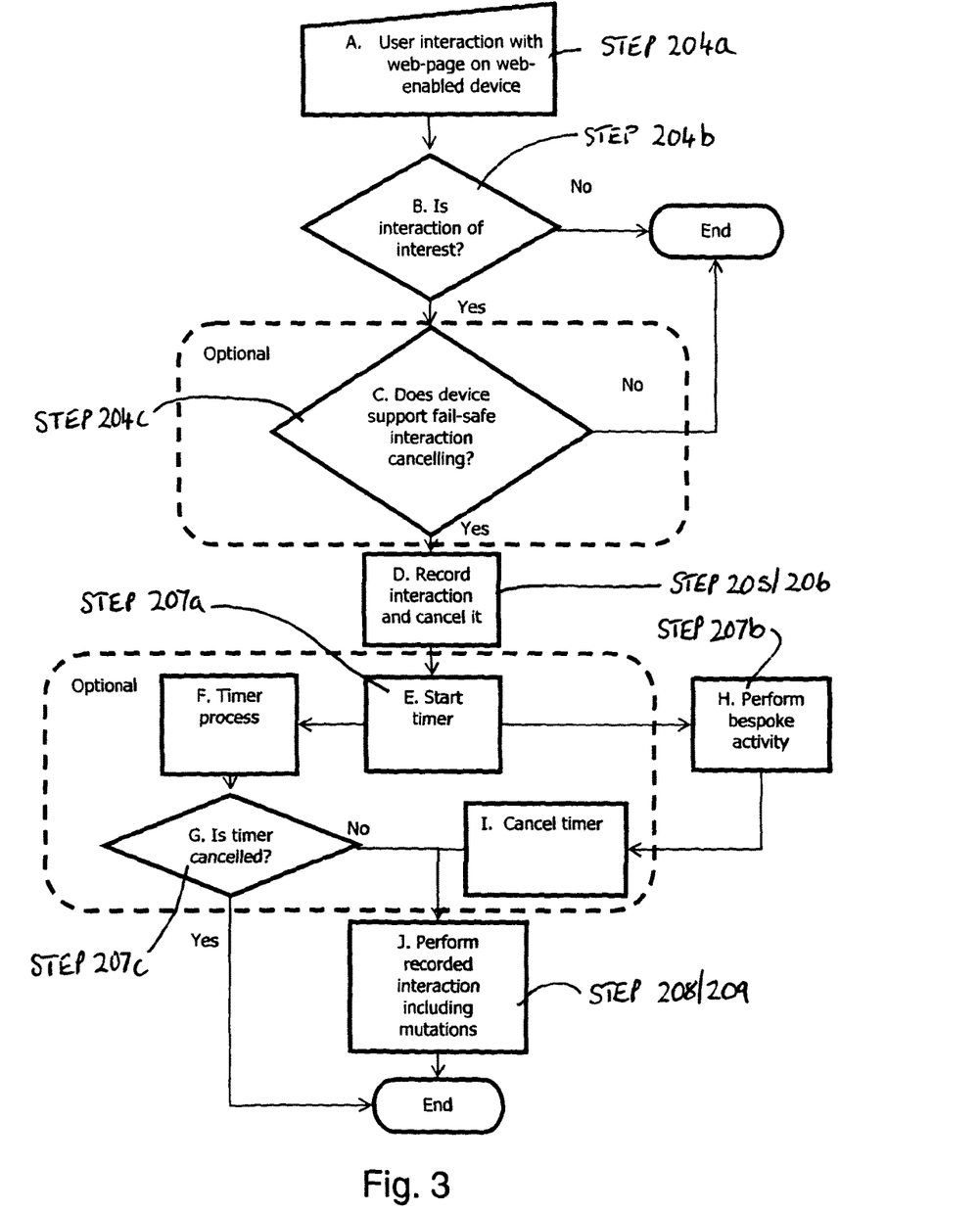
FIG. 3 shows a flow chart illustrating a particular implementation of the method illustrated in FIG. 2 used for enhancing collection of monitoring data from a web enabled device.

FIG. 3 shows a flow chart illustrating a method for enhancing the collection of monitoring information as mentioned in 1) above. The basic process of steps in this implementation is the same as steps 201 to 209 shown in FIG. 2 but the core part of the method is shown in more detail in the flow chart of FIG. 3.

Thus some of the steps shown in FIG. 2 are broken down into multiple sub steps in FIG. 3 and where appropriate these sub steps will be indicated using the same step number given in FIG. 2 but with a letter suffix.

Thus in step 204a, there is a user interaction with a webpage on the web enabled device 3. In step 204b a determination is made as to whether the interaction is of interest. If not the process ends. If the interaction is of interest then in step 204c a determination is made as to whether the web enabled device 3 supports fail-safe interaction cancelling. If not the process stops but if so the process continues. As noted in FIG. 3, this step of checking for fail-safe interaction cancelling is optional.

In step 205/206 the interaction is recorded and the result of it is cancelled.

Then, in this embodiment, in step 207a a timer function is initiated. At this point the process branches. In step 207b further processing is carried out. In this embodiment this comprises ensuring that the monitoring information collected during the time when the present webpage was active in the web enabled device 3 is sent to the collection server 2.

Step 207b may optionally also include further aspects of additional processing. Thus for example URL re-writing or security aspects may also be implemented, as will be described in more detail below in respect of the other implementations. If the processing in step 207b completes, it cancels the timer and in step 208/209 the appropriate controlled result is determined and caused to occur without further delay.

In step 207c a determination is made at the end of the timer period as to whether the timer has been cancelled by the successful completion of step 207b. If so nothing is to be done since the process has already completed. However if the timer has not been cancelled then in step 208/209 the appropriate controlled result is determined and caused to occur.

In the current simple case the controlled result is just a replaying of the original interaction and result. That is, here, the controlled result is the same as the intended result, but delayed. The timer is used to control the delay between the user interaction and the intended result, i.e. to ensure the delay is not too great. In other implementations the timer may be used to active introduce a delay, with the data export functionality running entirely separately and perhaps outside the control of the additional processing/the present client side module.

Figure 4:
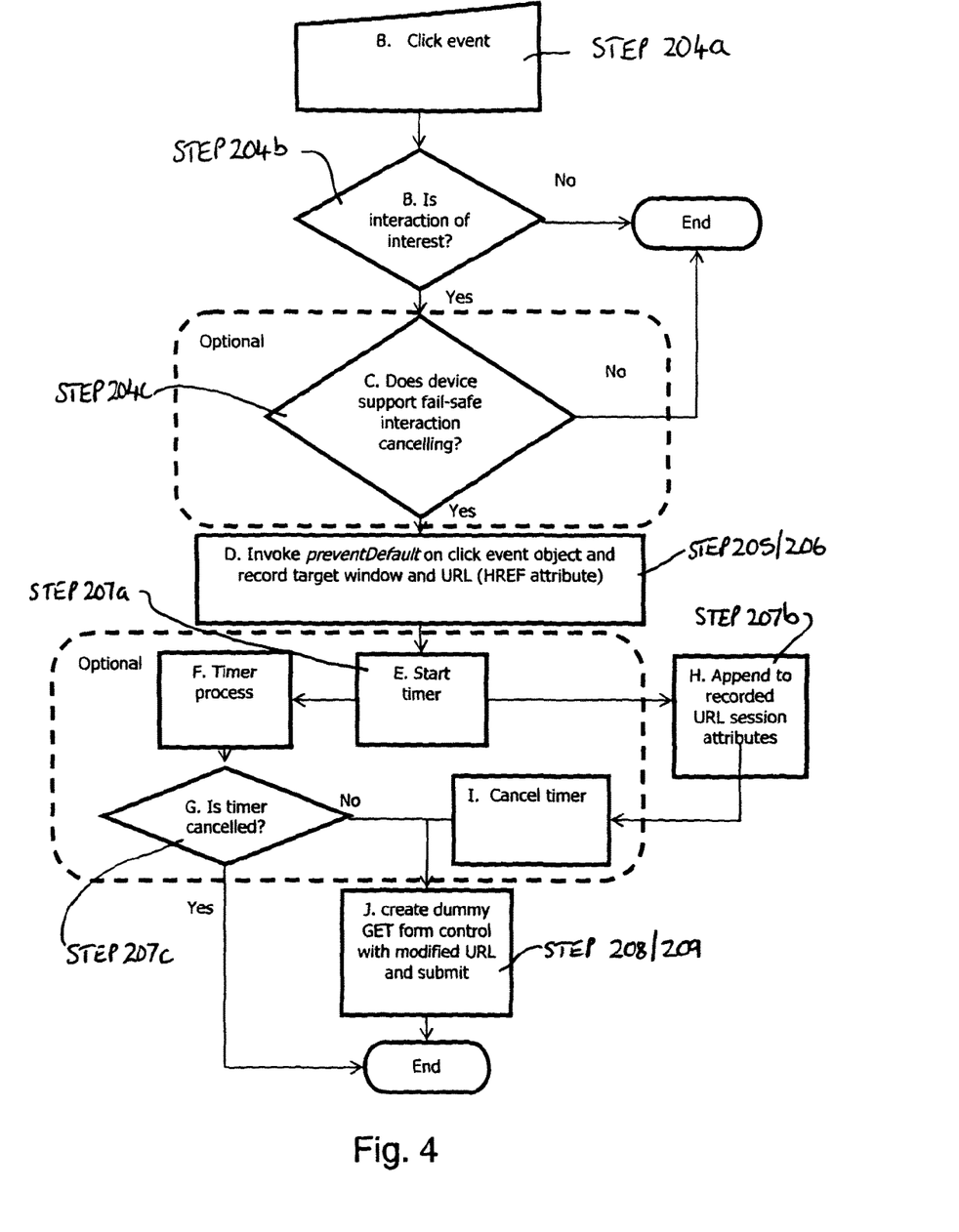
FIG. 4 shows a flow chart illustrating another particular implementation of the method illustrated in FIG. 2 used for enabling session context to be maintained using URL re-writing.

FIG. 4 shows a flow chart illustrating the URL re-writing process mentioned in 2) above in more detail. Again some of initial steps as shown in FIG. 2 are omitted from FIG. 4 and some of the steps shown in FIG. 2 are shown broken down into sub steps in FIG. 4 and labelled accordingly.

In step 204a a link is activated by being clicked upon. In step 204b it is determined whether the interaction is of interest. In practice in the present embodiment this means determining whether the click will lead to a page transition. If not the process ends. However assuming that the activation of the link will lead to a page transition, then in step 204c it is determined whether the web enabled device 3 supports fail-safe interaction cancelling (again an optional step). Assuming that fail-safe interaction cancelling is supported, then in step 205/206 the prevent default method on the click event object is invoked and the target page URL is recorded. Then in step 207a a timer process is started and the processing branches such that whilst the timer is running, further processing is carried out in step 207b. In this case the target URL is re-written to include session context parameters. If the processing in step 207b completes, it cancels the timer and in step 208/209 the appropriate controlled result is determined and caused to occur without further delay.

In step 207c, a determination is made as to whether the timer has been cancelled by the successful completion of step 207b. If so nothing is done as the process has been completed as above. However if the timer has not been cancelled then in step 208/209 the controlled result is determined and caused to occur.

In this case the controlled result, assuming that there has been time to complete its generation, is the creation of a dummy GET form control including the re-written URL which is then submitted.

The result of this is that the web enabled device 3 requests and has delivered to it, the original target page, but because the URL query string has been re-written to include session parameters then the web enabled device 3 will be able to see these session context parameters and pick them up when processing the target page.

This means that session context may be maintained where the target page also serves to call another instance of the same client side module 31. In particular session context may be maintained where the user is using his web enabled device 3 to navigate from a first page belonging to one entity to a second page belonging to the same entity, and each is appropriately client side tagged. This can allow generation of a constant stream of monitoring information across that whole session. Furthermore, because the session context information is included in the URL query string, session context can be maintained even when the target page is in a different domain from the original page. Thus this technique obviates the need for using cookies to maintain session context and also gets around the problem of not being able to use third party cookies in practical situations such that session context may be conveniently maintained across domains.

Note that in the present technique, this URL re-writing is carried out at the web enabled device 3 and in particular, in this embodiment, is carried out by the client side module 31 operating on the web enabled device 3. This means that there is no need for a server to be involved in the URL re-writing process and the technique is inherently scalable. No modification to the webpage is required to achieve this result, other than the inclusion of a tag to call the client side module, as is already commonly done for interaction monitoring purposes. Further the technique is independent of the website structure and back end technology which dramatically eases the process of providing this functionality for a broad range of websites.

Figure 5:
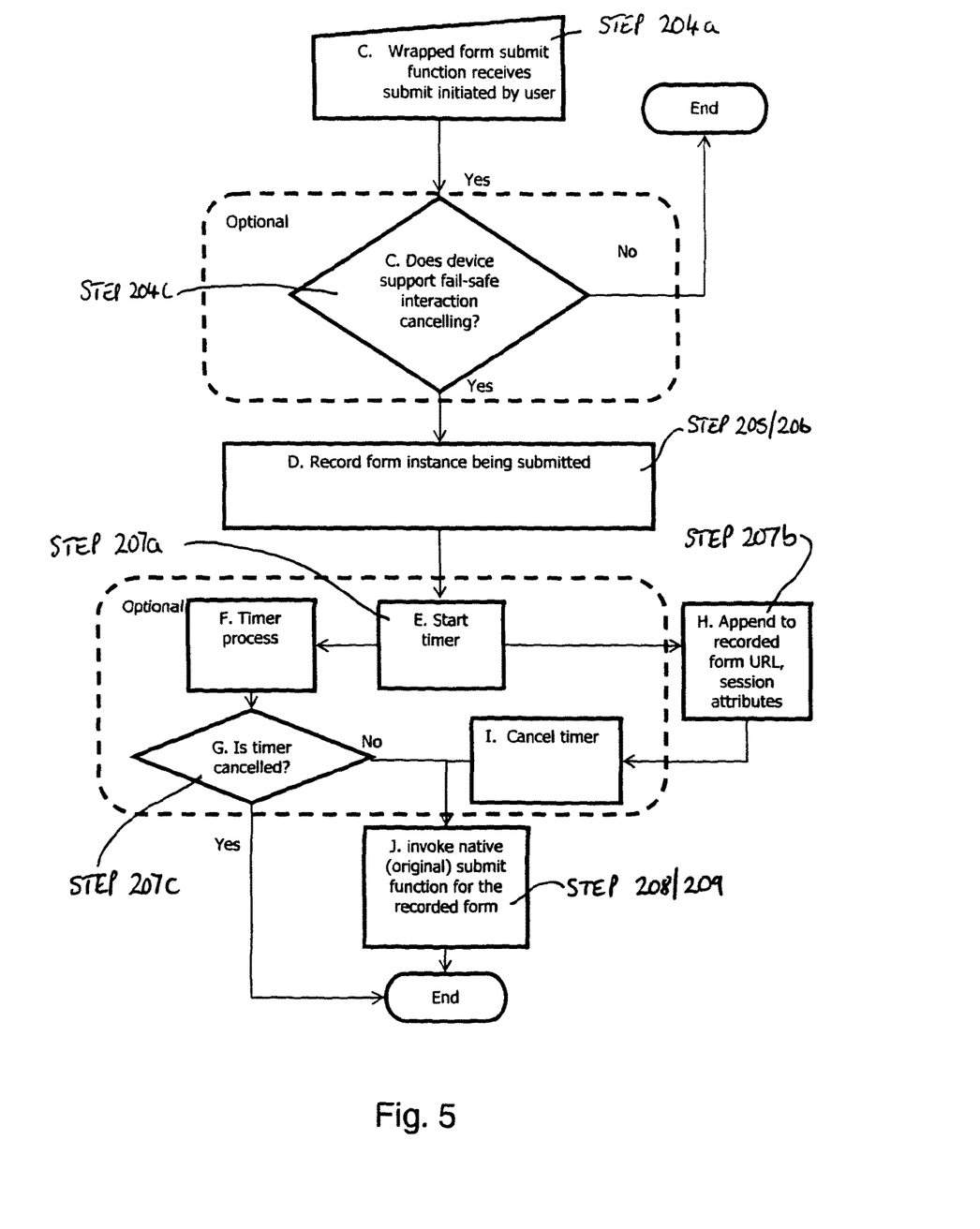
FIG. 5 shows a flow chart illustrating another particular implementation of the method illustrated in FIG. 2 used for enabling session context to be maintained using URL re-writing.

FIG. 5 shows a similar method for maintaining session context as described above with reference to FIG. 4. However in this instance the method shows the steps taken where the interaction which triggers the steps corresponding to step 205 to 209 in FIG. 2, is the activation of a form submit function by a user.

Thus in step 204a a wrapped form submit function receives a submit initiated by a user. Following this, in step 204c, a determination is made as to whether the device supports fail-safe interaction cancelling. Assuming that such fail-safe interaction cancelling is supported, then the method proceeds to step 205/206 where due to the form wrapping, the original intended result is prevented or at least put on hold and details of the intended result can be captured.

Then the process proceeds in the same fashion as that described above in respect of FIG. 4. A timer is initiated in step 207a and the process branches with the timer running unless it is cancelled in step 207c by the fail-safe interaction cancelling functionality. In parallel to this, the URL specified in the form submit is re-written to include session context parameters in step 207b. Assuming that this action completes during the time delay allowed by the timer process, then in step 208/209 the controlled result is determined and caused to occur. In this case this is by invoking the original submit function from the wrapped form whilst including the re-written URL in the accompanying page request.

Thus as described above in respect of FIG. 4, the net result is that the session context parameters will be visible to the web enabled device 3 when viewing the target page specified in the original form submit. This in turn means that a client side module 31 operated whilst the target page is active, can see the session context parameters so that session context may be maintained. Further, this may be done irrespective of the domains of the original page and the target page and without the use of any cookies.

As illustrated above the present methods, as described above with reference to FIGS. 2 to 5, may be used as part of a website monitoring method or system. In such a case, the ability to delay page transitions whilst collected monitoring information is exported and the ability to maintain session context as page transitions occur, can enhance the functionality and effectiveness of the website monitoring method/system in a particularly neat and efficient way.

As mentioned above a third particular aspect of the present ideas is their use in providing security functionality. In such methods, besides the nature of the additional processing 207 the methods are like those of FIGS. 3, 4 and 5.

Further, in such a case the additional processing which is carried out in step 207 of the method claim in FIG. 2 may similarly contain the timer functions illustrated in FIGS. 3, 4 and 5 as carried out in steps 207a and 207c.

However, when providing security functionality, the further processing carried out in 207b may include checking to see whether the link or form which is being activated is a valid link or form for that webpage or, for example, is requiring a page transition to a page which is specified in a list of allowed pages and/or domains. A result of this may be allowing the page transition to occur in step 208/209 if the link/page transition is valid and preventing it if not.

Similarly or alternatively the further processing in step 207b may be such as to determine whether referrer information known by code executing within the page should be removed as part of the page transition. This might be done on the same basis for all page transitions or may be selectively done in dependence on whether the page transition to be made is to a page appearing in an allowed list for example an allowed list of links, pages, websites, domains or so on.

It will be appreciated that these security aspects of the method as described above may, where appropriate, be used together with the other aspects of the ideas described above.

That is to say, in general terms, the enhanced collection process mentioned under 1) above, the URL re-writing process mentioned under 2) above, and the security aspects mentioned under 3) above may be used either in isolation or together with one another in any particular combination or sub combination.

In a particular implementation, the step of determining whether the interaction is of interest in step 204b may include the specific test of checking whether the interaction is the activation of a link or a form post and, if not ignoring the interaction. After this, the check may comprise (where the interaction is a link) the further step of determining whether the target for the link is within the same browser window/frame/iframe as where the interaction originated. If not the interaction is then ignored.

Further, in particular implementations of the above methods, the client side module may be arranged for recording interactions with a webpage and for later playing out those interactions. This is one way in which details of the interaction and its intended result can be captured.

In the methods described above, use of a timer process as an optional part of the process is mentioned. Where such a timer is used, a suitable default timeout period for the timer to run (i.e. a suitable delay) is currently considered to be 500 ms.

As it is believed will be clear from the description above, the timer process carried out in steps 207a and 207c in the above methods is conducted asynchronously with the further processing carried out in step 207b. That is to say these processes are independent of one another within the program flow.

The present embodiments of the invention may be embodied in various different forms for example: a method, a computer (i.e. web enabled device) arranged under the control of software, a computer program, a computer program stored on a machine readable record carrier such as a disk (hard disc, CD-ROM, DVD-ROM or so on) or memory module, or as carried on a signal.

The invention claimed is:

1. A web enabled device arranged for controlling webpage behavior on the web enabled device, the web enabled device being arranged under the control of software to:
    monitor a user interaction with a webpage, using client side page tagging webpage monitoring with a client side JavaScript module running within the webpage on the web enabled device, the client side module being delivered from a server to the web enabled device upon being called from tagging in the webpage or being loaded from a storage of the web enabled device having previously been delivered from the server, upon being called from tagging in the webpage;
    determine whether predetermined conditions are satisfied, and being arranged, where the predetermined conditions are satisfied, to:
        capture details concerning an intended result of said user interaction, using the client side module running within the webpage, the intended result being an intended resulting operation of the web enabled device;
        cancel occurrence of the intended result of said user interaction using the client side module running within the webpage;
        carry out additional processing using the client side module running within the webpage;
        determine a controlled result, using the client side module running within the webpage, in dependence on said intended result and the additional processing; and
        cause the controlled result to occur,
    wherein, the predetermined conditions comprise the user interaction being one having an intended result of causing a page transition at the web enabled device, which would lead to navigation to a target page, and said details concerning the intended result of said user interaction comprise capturing the uniform resource locator (URL) of the target page, and the controlled result is a controlled resulting operation of the web enabled device and comprises one of:
        i) no action in response to the user interaction such that navigation is cancelled;
        ii) a regeneration, under control of the client side module running within the webpage, of the intended result leading to navigation to the target page but after a delay introduced by the additional processing; and
        iii) a modified result, determined under control of the client side module running within the webpage, which is a modified resulting operation of the web enabled device leading to navigation to the target page but with a modified version of the captured uniform resource locator (URL) query string or with referrer information deleted or leading to navigation to a different page.

2. A web enabled device according to claim 1 in which the carrying out additional processing comprises introducing a delay between said user interaction and the step of causing the controlled result to occur.

3. A web enabled device according to claim 2 in which the carrying out additional processing comprises carrying out further processing steps during said delay.

4. A web enabled device according to claim 2 in which the additional processing comprises using a timer to control said delay.

5. A web enabled device according to claim 1 in which the additional processing comprises any one of or any combination of:
    dynamic URL re-writing of a URL for a target page identified in the captured details concerning the intended result of said user interaction to append selected parameters;
    processing and exporting monitoring data collected during interaction with the webpage;
    verifying whether a target page specified in a page transition identified in the captured details concerning the intended result of said user interaction belongs to a predetermined set of valid pages;
    determining whether referrer information held at the web enabled device should be deleted to prevent onward transmission to a subsequent page.

6. A web enabled device according to claim 5 in which there is dynamic URL re-writing and the selected parameters appended to the URL in the URL re-writing comprise session context parameters for the client side module.

7. A web enabled device according to claim 1 in which the determining whether predetermined conditions are satisfied comprises the steps of the client side module applying a filter to the user interaction with the webpage and determining whether said user interaction passes said filtering.

8. A web enabled device according to claim 7 in which at least one of the filter specifies at least one type of interaction which passes the filter and the filter specifies at least one characteristic of an interaction which is at least one of necessary and sufficient for the respective interaction to pass the filter.

9. A web enabled device according to claim 8 in which the characteristic of an interaction comprises a characteristic of an intended result of the interaction.

10. A web enabled device according to claim 1 in which the web enabled device is arranged to cause the intended result to occur as the controlled result if at least one of:
the additional processing fails;
the additional processing fails to complete before the end of a delay allowed by a timer as part of the additional processing;
fail-safe interaction cancelling of the web enabled device is invoked.

11. A method of controlling webpage behavior on a web enabled device comprising the steps of:
monitoring a user interaction with a webpage, using client side page tagging webpage monitoring with a client side JavaScript module running within the webpage on the web enabled device, the client side module being delivered from a server to the web enabled device upon being called from tagging in the webpage or being loaded from a storage of the web enabled device having previously been delivered from the server, upon being called from tagging in the webpage;
determining whether predetermined conditions are satisfied, and where the predetermined conditions are satisfied, carrying out the further steps of:
capturing details concerning an intended result of said user interaction, using the client side module running within the webpage, the intended result being an intended resulting operation of the web enabled device;
cancelling occurrence of the intended result of said user interaction using the client side module running within the webpage;
carrying out additional processing using the client side module running within the webpage;
determining a controlled result, using the client side module running within the webpage, in dependence on said intended result and the additional processing; and
causing the controlled result to occur,
wherein, the predetermined conditions comprise the user interaction being one having an intended result of causing a page transition at the web enabled device which would lead to navigation to a target page, and said details concerning the intended result of said user interaction comprise capturing the uniform resource locator (URL) of the target page, and
the controlled result is a controlled resulting operation of the web enabled device and comprises one of:
i) no action in response to the user interaction such that navigation is cancelled;
ii) a regeneration, under control of the client side module running within the webpage, of the intended result leading to navigation to the target page but after a delay introduced by the additional processing; and
iii) a modified result, determined under control of the client side module running within the webpage, which is a modified resulting operation of the web enabled device, leading to navigation to the target page but with a modified captured uniform resource locator (URL) query string or with referrer information deleted or leading to navigation to a different page.

12. A web enabled device arranged for collecting client side webpage monitoring information, the web enabled device being arranged under the control of software to:
monitor user interactions with a webpage and collect monitoring information, using client side page tagging webpage monitoring with a client side JavaScript module running within the webpage at the web enabled device, the client side module being delivered from a server to the web enabled device upon being called from tagging in the webpage or being loaded from a storage of the web enabled device having previously been delivered from the server, upon being called from tagging in the webpage;
send data representative of said monitoring information from the web enabled device to a server;
determine whether an intended result of a monitored user interaction comprises a page transition, and
being arranged, where the intended result of the monitored user interaction comprises a page transition, to:
capture details concerning the intended result of said monitored user interaction, using the client side module;
at least temporarily prevent occurrence of the intended result of said monitored user interaction using the client side module running within the webpage;
carry out additional processing using the client side module running within the webpage;
determine a controlled result, using the client side module running within the webpage, in dependence on said intended result and the additional processing; and
cause the controlled result to occur,
wherein said additional processing comprises using a timer to control a delay between said user interaction and the controlled result being caused to occur and the predetermined conditions comprise the user interaction being one having an intended result of causing a page transition at the web enabled device, which would lead to navigation to a target page, and said details concerning the intended result of said user interaction comprise capturing the uniform resource locator (URL) of the target page, and the controlled result is a controlled resulting operation of the web enabled device and comprises one of:
i) no action in response to the user interaction, such that the navigation is cancelled;
ii) a regeneration, under control of the client side module running within the webpage, of the intended result, leading to navigation to the target page but after some delay introduced by the additional processing; and
iii) a modified result, determined under control of the client side module running within the webpage, which is a modified resulting operation of the web enabled device, leading to navigation to the target page but with a modified captured uniform resource locator (URL) query string or with referrer information deleted or leading to navigation to a different page.

13. A web enabled device running a web client and arranged for maintaining session context, the web enabled device being arranged under the control of software to:
monitor a user interaction with a webpage, using client side page tagging webpage monitoring with a client side JavaScript module running within the webpage at the web enabled device, the client side module being delivered from a server to the web enabled device upon being called from tagging in the webpage or being loaded from a storage of the web enabled device having previously been delivered from the server, upon being called from tagging in the webpage;
determine whether an intended result of the monitored user interaction comprises a page transition to a target page, and being arranged, where the intended result of the monitored user interaction comprises a page transition, to:

capture details concerning the intended result of said user interaction including a URL for the target page, using the client side module running within the webpage;
at least temporarily prevent occurrence of the intended result of said user interaction using the client side module running within the webpage;
carry out additional processing using the client side module running within the webpage;
determine a controlled result, using the client side module running within the webpage, in dependence on said intended result and the additional processing; and
cause the controlled result to occur,
wherein the additional processing by client side module running within the webpage comprises dynamic URL re-writing of the URL for the target page identified in the captured details concerning the intended result of said user interaction to provide a re-written URL including appended session context parameters; and
said controlled result comprises the web enabled device requesting the target page using the re-written URL.

14. A web enabled device arranged for providing security, the web enabled device being arranged under the control of software to:
monitor a user interaction with a webpage, using client side page tagging webpage monitoring with a client side JavaScript module running within the webpage at the web enabled device, the client side module being delivered from a server to the web enabled device upon being called from tagging in the webpage or being loaded from a storage of the web enabled device having previously been delivered from the server, upon being called from tagging in the webpage;
determine whether an intended result of the monitored user interaction comprises a page transition to a target page, and being arranged, where the intended result of the monitored user interaction comprises a page transition, to:
capture details concerning the intended result of said user interaction, using the client side module running within the webpage;
at least temporarily prevent occurrence of the intended result of said user interaction using the client side module running within the webpage;
carry out additional processing within the web client using the client side module running within the webpage;
determine a controlled result, using the client side module running within the webpage, in dependence on said intended result and the additional processing; and
cause the controlled result to occur,
wherein the controlled result comprises one of:
the web enabled device requesting the target page whilst while suppressing referrer information; and
cancelling of the page request.

15. A non-transitory machine readable medium carrying a computer program comprising code portions which when loaded and run on a web enabled device cause the web enabled device to constitute a web enabled device as claimed in claim 1 arranged for controlling webpage behavior on the web enabled device, the web enabled device being arranged under the control of software to:
monitor a user interaction with a webpage, using client side page tagging webpage monitoring with a client side JavaScript module running within the webpage on the web enabled device, the client side module being delivered from a server to the web enabled device upon being called from tagging in the webpage or being loaded from a storage of the web enabled device having previously been delivered from the server, upon being called from tagging in the webpage;
determine whether predetermined conditions are satisfied, and being arranged, where the predetermined conditions are satisfied, to:
capture details concerning an intended result of said user interaction, using the client side module running within the webpage, the intended result being an intended resulting operation of the web enabled device;
cancel occurrence of the intended result of said user interaction using the client side module running within the webpage;
carry out additional processing using the client side module running within the webpage;
determine a controlled result, using the client side module running within the webpage, in dependence on said intended result and the additional processing; and
cause the controlled result to occur,
wherein, the predetermined conditions comprise the user interaction being one having an intended result of causing a page transition at the web enabled device, which would lead to navigation to a target page, and said details concerning the intended result of said user interaction comprise capturing the uniform resource locator (URL) of the target page, and the controlled result is a controlled resulting operation of the web enabled device and comprises one of:
i) no action in response to the user interaction such that navigation is cancelled;
ii) a regeneration, under control of the client side module running within the webpage, of the intended result leading to navigation to the target page but after a delay introduced by the additional processing; and
iii) a modified result, determined under control of the client side module running within the webpage, which is a modified resulting operation of the web enabled device leading to navigation to the target page but with a modified uniform resource locator (URL) query string or with referrer information deleted or leading to navigation to a different page.

16. A web enabled device according to claim 1, wherein (a) if the user interaction is an activation of a link, the link activation event's prevent default method is invoked to cancel occurrence of the intended result, and (b) if the user interaction is activation of a submit on a form, the step of cancelling occurrence of the intended result comprises wrapping the form in another object,
wherein wrapping the form in another object comprises renaming an original submit function of the form from an old name to a new name and renaming said other object with the old name of the original submit function.

17. A web enabled device according to claim 1, wherein the predetermined conditions further comprise fail-safe interaction cancelling being supported by the web-enabled device.

18. A web enabled device arranged for controlling webpage behavior on the web enabled device, the web enabled device being arranged under control of software to:
monitor a user interaction with a webpage, using client side page tagging webpage monitoring with a client side JavaScript module running on the web enabled device, the client side module being delivered from a server to the web enabled device upon being called from tagging in the webpage or being loaded from a storage of the web enabled device having previously been delivered from the server, upon being called from tagging in the webpage;

determine whether predetermined conditions are satisfied, and being arranged, where the predetermined conditions are satisfied, to:
  capture details concerning an intended result of said user interaction, using the client side module, the intended result being an intended resulting operation of the web enabled device;
  cancel occurrence of the intended result of said user interaction using the client side module;
  carry out additional processing using the client side module;
  determine a controlled result, using the client side module, in dependence on said intended result and the additional processing; and
  cause the controlled result to occur,
wherein, the predetermined conditions comprise the user interaction being one having an intended result of causing a page transition at the web enabled device, which would lead to navigation to a target page, and said details concerning the intended result of said user interaction comprise capturing the uniform resource locator (URL) of the target page, and the controlled result is a controlled resulting operation of the web enabled device and comprises
  a regeneration, under control of the client side module, of the intended result leading to navigation to the target page but after a delay introduced by the additional processing,
  wherein during the delay introduced by the additional processing, the client side module is arranged to process and export monitoring data to a collection server.

19. A web enabled device according to claim 18, wherein (a) if the user interaction is an activation of a link, the link activation event's prevent default method is invoked to cancel occurrence of the intended result, or (b) if the user interaction is activation of a submit on a form, the step of cancelling occurrence of the intended result comprises wrapping the form in another object,
  wherein wrapping the form in another object comprises renaming an original submit function of the form from an old name to a new name and renaming said other object with the old name of the original submit function.

20. A web enabled device according to claim 18, wherein the predetermined conditions further comprise fail-safe interaction cancelling being supported by the web-enabled device.

21. A web enabled device arranged for maintaining session context, the web enabled device being configured to:
  monitor a user interaction with a webpage, using client side page tagging web page monitoring with a client side JavaScript module running on the web enabled device, the client side module being delivered from a server to the web enabled device upon being called from tagging in the webpage or being loaded from a storage of the web enabled device having previously been delivered from the server, upon being called from tagging in the webpage;
  send monitoring information to a collection server with session context parameters, using the client side module;
  determine whether an intended result of the monitored user interaction comprises a page transition to a target page in one domain of a predetermined set of domains, and being arranged, where the intended result of the monitored user interaction comprises a page transition to a target page in one of a predetermined set of domains to:
    capture details concerning the intended result of said user interaction including a URL for the target page, using the client side module;
    at least temporarily prevent occurrence of the intended result of said user interaction using the client side module;
    carry out additional processing using the client side module;
    determine a controlled result, using the client side module, in dependence on said intended result and the additional processing; and
    cause the controlled result to occur,
  wherein the additional processing by client side module comprises, dynamic URL re-writing of the URL for the target page identified in the captured details concerning the intended result of said user interaction to provide a re-written URL including appended session context parameters based on said session context parameters being sent to the collection server; and
  said controlled result comprises the web enabled device requesting the target page using the re-written URL,
  wherein the web enabled device is further configured to:
    load the target page and where the target page is appropriately client side tagged, call a second instance of the client side module; and
    send monitoring information to the collection server using the second instance of client side module with session context parameters based on those extracted from the re-written URL.

22. A web enabled device according to claim 21, wherein (a) if the user interaction is an activation of a link, the link activation event's prevent default method is invoked to cancel occurrence of the intended result, or (b) if the user interaction is activation of a submit on a form, the step of cancelling occurrence of the intended result comprises wrapping the form in another object,
  wherein wrapping the form in another object comprises renaming an original submit function of the form from an old name to a new name and renaming said other object with the old name of the original submit function.

23. A web enabled device according to claim 21, wherein the predetermined conditions further comprise fail-safe interaction cancelling being supported by the web-enabled device.

* * * * *